Sept. 26, 1944.  C. W. LEGUILLON  2,358,935
APPARATUS FOR APPLYING TREADS
Filed Nov. 27, 1940
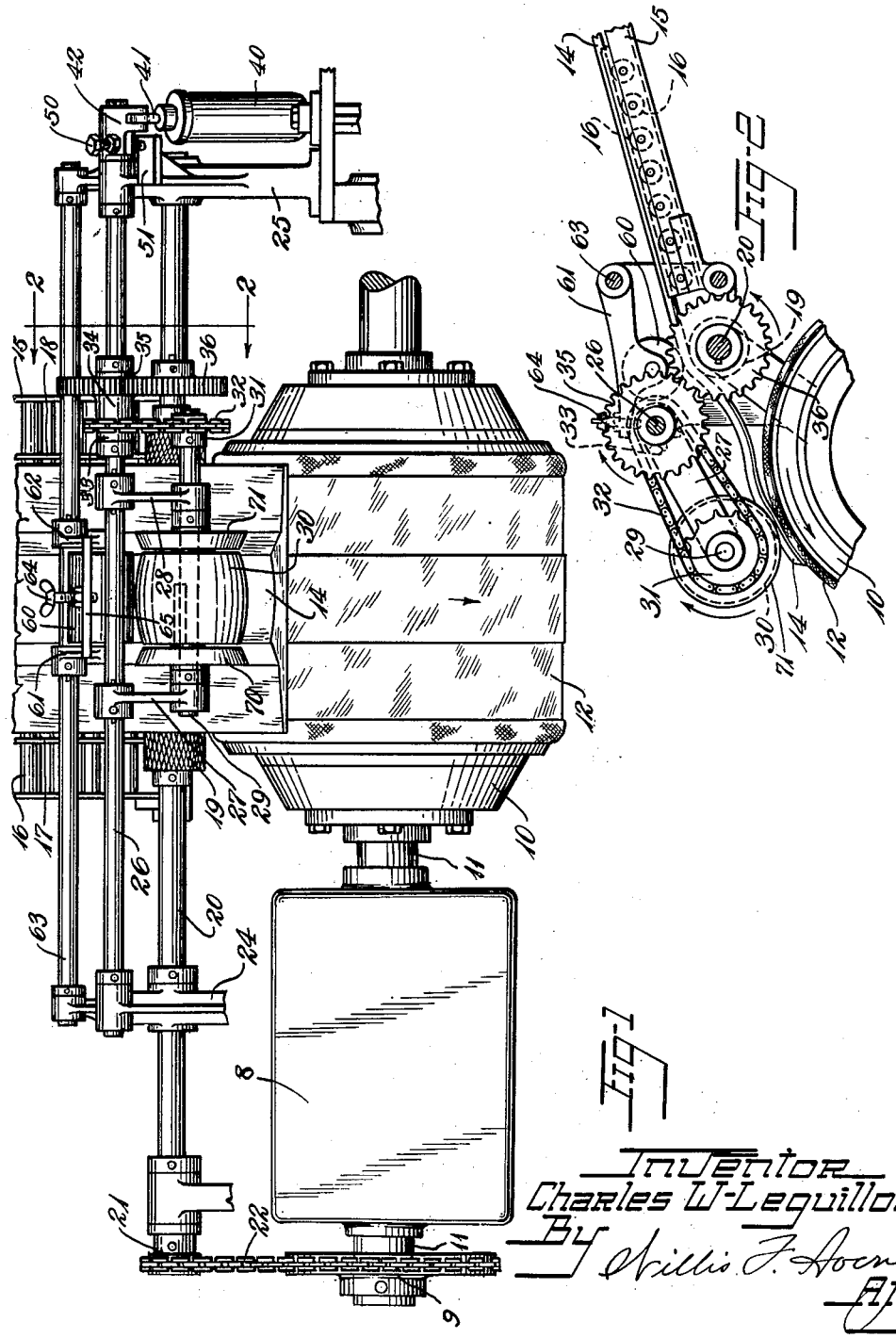
Inventor
Charles W. Leguillon
By Patented Sept. 26, 1944

2,358,935

UNITED STATES PATENT OFFICE 2,358,935

APPARATUS FOR APPLYING TREADS

Charles W. Leguillon, Akron, Ohio, assignor to
The B. F. Goodrich Company, New York, N. Y.,
a corporation of New York Application November 27, 1940, Serial No. 367,437

1 Claim. (Cl. 154—9)

This invention relates to applying treads of rubber-like material to tires and is particularly useful in the manufacture of pneumatic tires on building drums.

In the manufacture of pneumatic tires, for the underlying body of the casing, bands of cord fabric or other sheet material together with bead cores have been assembled about a former or drum. The unvulcanized material for forming the overlying tread and side walls of the tire have been extruded or calendered to the desired cross-section and have usually been cut to length and fed to the drum while the drum was rotated through a single revolution, after which the ends of the tread have been spliced together. Due to the fact that the slab of tread material has shrunk somewhat after being cut to length, causing a resulting thickening of the slab near its ends, and the splicing of these ends to each other has involved some overlapping of such ends, the tire resulting from such operations often has been undesirably unbalanced, being heavy at the side containing the splice. As the tread slab has been stretched longitudinally between the point of first attachment and the point of supply in feeding it to the drum, usually manually, it has naturally stretched most at its thinnest portion and least at its thickest portion so that stretching of the tread has aggravated the difficulty. Furthermore, where a slab of tread is pulled from a supply conveyor by dragging it therefrom the tread is stretched progressively from one end to the other, the stretch being greater at the start than at the finish.

The present invention aims to apply the tread slab more evenly, providing a better balanced article.

The principal objects of the invention are to provide for applying the tread slab evenly and preferably free from stretch and in a longitudinally compacted condition, to provide a tire having better balance, to promote uniformity of product, and to provide simplicity of apparatus and convenience of procedure.

These and other objects will appear from the following description and the accompanying drawing.

Of the drawing:

Fig. 1 is a plan view of the apparatus constructed according to and embodying the invention, as applied to a known type of tire building machine, at the start of the operation of applying the tread slab, parts being broken away.

Fig. 2 is a detail elevation thereof taken along line 2—2 of Fig. 1, parts being broken away.

In accordance with the invention the tread is fed to the tire building drum evenly and preferably free from tension to compact it progressively as it is adhered to the tire carcass, and apparatus is provided for automatically accomplishing progressive compacting and applying of the slab.

Referring to the drawing, the numeral 10 designates a tire building drum mounted upon the shaft 11 of a conventional driving unit 8 to which it is fixed. A tire carcass 12 has been completed by application of tire carcass material such as cord fabric to the face of the drum and a tread slab 14 is shown as being applied to the drum. The tread slab is fed over an inclined chute 15 having anti-friction rollers 16, for supporting the slab without drag, and along adjustable guides 17, 18 for centering the slab with respect to the drum.

A knurled roller 19 is fixed to a shaft 20, mounted parallel to the axis of the drum 10 and at the lower end of the chute 15, and a sprocket 21 is fixed to shaft 20 for engaging a chain 22 whereby the shaft may be rotated at the same surface speed as the drum. The chain 22 is ordinarily driven from a sprocket 9 fixed to shaft 11, which supports the drum. The shaft 20 may be rotatably supported in fixed frame members 24, 25. A shaft 26, parallel to shaft 20 and rotatably mounted in frame members 24, 25 has a pair of arms 27, 28 fixed thereto. A shaft 29 is rotatably mounted parallel to shafts 20 and 26 in bearings formed in the ends of arms 27, 28 and has a tread roller 30 fixed thereto, the arrangement being such that the tread roller may be swung toward and away from the drum for contact with the tread slab.

For rotating the tread roller 30 a sprocket 31 is fixed to shaft 29 and is engaged by a chain 32 adapted to be driven by a sprocket 33. Sprocket 33 is fixed to a quill 34 which is rotatably mounted about shaft 26, previously described. A gear 35 is also fixed to quill 34 and is adapted to mesh with a similar gear 36 fixed to shaft 20. The arrangement is such that the roller 30 is driven at a surface speed in excess of that of the drum 10 regardless of its position with relation thereto. The roller 19 is driven at a surface speed no less than that of the drum and preferably at the same surface speed as the drum 10.

Means is provided for moving the tread roller 30 toward and from the drum 10 and for holding it at a fixed position with relation thereto. For this purpose a fluid pressure cylinder 40 is pivotally mounted on frame member 25 and its piston rod 41 is pivotally connected to the free end of an arm 42 fixed to shaft 26. The piston rod is actuated by a substantially non-compressible fluid such as oil through pipe connections (not shown) which feed the cylinder 40. Oil admitted to the cylinder above the piston moves the roller 30 toward the drum 10 and oil admitted to the lower part of the cylinder below the piston moves the roller 30 away from the drum. A stop screw 50 adjustably mounted on arm 42 is adapted to engage a stop 51 on frame member 25 and limits movement of the roller 30 toward the drum.

For assisting the roller 19 in feeding the slab 14, a pressure roller 60 is rotatably mounted thereabove in a pair of swing arms 61, 62 fixed to a shaft 63. Shaft 63 is rotatably mounted with its axis parallel to that of roller 19 in bearings formed in frame members 24, 25. The arrangement is such that the roller 60 may swing toward and from roller 19 and presses the slab 14 thereagainst by its own weight. An adjustable stop screw 64 is threaded through a bar 65 connecting arms 61, 62 and is adapted to engage shaft 26 as a stop to limit movement of the roller 60 toward roller 19.

The operation of the apparatus is as follows:

With the drum 10 mounted on the spindle 11 a slab 14 of unvulcanized tread material is advanced over the chute 15 to a position where its leading end is below roller 30 and the leading end is adhered to the material on the drum. Fluid under pressure is supplied to the upper end of cylinder 40 so that roller 30 is pressed against the leading end of the slab. Motion of the roller is limited by stop 50.

Rotation of the drum 10 is started and roller 30 which is geared thereto is driven at a faster surface speed than that of the drum so that no stretching of the slab takes place but on the other hand a progressive forcing or longitudinal compacting of the slab occurs at the position of its contact with the drum. Rotation is continued until the slab has been laid circumferentially of the drum. The roller 30 is then lifted out of the way of the drum by reversal of fluid pressure in cylinder 40.

Due to the absence of any stretch of the slab, thin portions thereof are not thinned further by localized stretch of the slab due to reduced strength at that position, while the progressive longitudinal compression, applied to the slab by the superior surface speed of roller 30, locally thickens the slab at any such thin portion, and applies the entire slab under longitudinal compression, a condition which is found to be conducive to uniform construction and better balance in the completed tire.

Where the tread is of such contour as to require a roller having portions generally varying in diameter along its length so that good rolling contact without excessive slippage is difficult, the roller 30 may be of less width than the tread slab as shown in Fig. 1, and free-running flanking rolls 70, 71 may be rotatably mounted adjacent thereto on shaft 29. Such rolls may be of such face contour as to contact the margins of the slab by a simple rolling action while the roller 30 therebetween is positively driven.

Variations may be made without departing from the spirit of the invention as the invention is defined by the following claim.

I claim:

Apparatus for assembling a slab of plastic material upon a tire article, said apparatus comprising a rotatable drum for progressively advancing an annular tire element, means for rotating said drum, a rotatable pressing member adjacent thereto for pressing a slab of plastic material against said tire element, said pressing member having a continuous work-contacting face and being geared to said drum so as to be rotated at a greater surface speed than that of said drum for compacting the slab longitudinally, and pressure means for holding said member in spaced relation to the surface of said drum.

CHARLES W. LEGUILLON.